No. 675,746. Patented June 4, 1901.
D. LIPPY.
SEPARATOR SIEVE.
(Application filed Dec. 7, 1900.)
(No Model.)
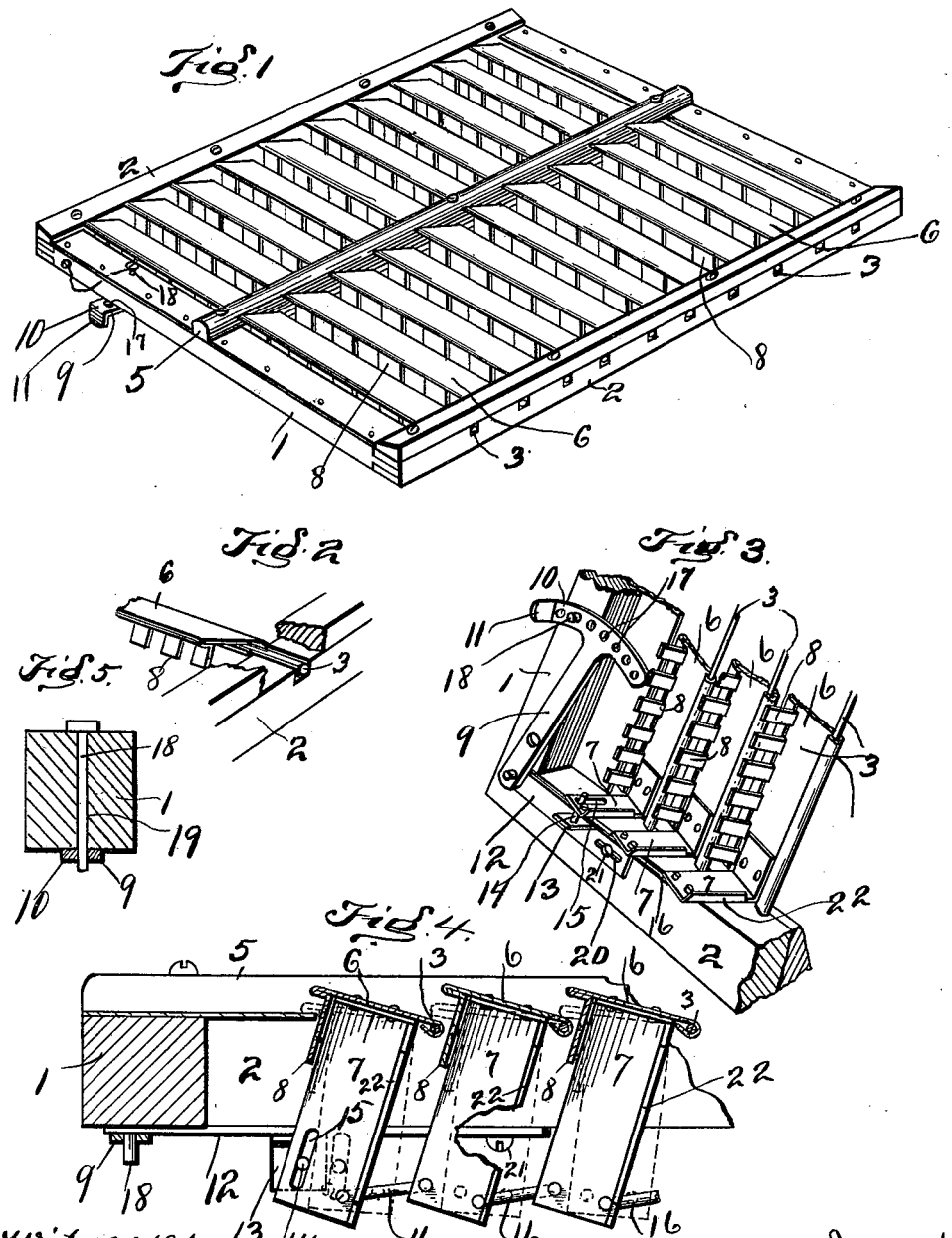
Witnesses
Inventor
David Lippy

UNITED STATES PATENT OFFICE.

DAVID LIPPY, OF MANSFIELD, OHIO.

SEPARATOR-SIEVE.

SPECIFICATION forming part of Letters Patent No. 675,746, dated June 4, 1901.

Application filed December 7, 1900. Serial No. 39,026. (No model.)

*To all whom it may concern:*

Be it known that I, DAVID LIPPY, a citizen of the United States, residing at Mansfield, in the county of Richland and State of Ohio, have invented certain new and useful Improvements in Separator-Sieves; and I do hereby declare that the following is a full, clear, and exact description of the same, reference being had to the annexed drawings, making a part of this specification, and to the figures of reference marked thereon, in which—

Figure 1 is perspective view. Fig. 2 is a view showing a portion of one of the side bars and illustrating one of the blade or slat rods, also showing a portion of one of the blades. Fig. 3 is a bottom or under side view showing a portion of the blades or slats and their rods, also showing the mechanism for adjusting the slats. Fig. 4 is an enlarged longitudinal section showing a portion of the sieve. Fig. 5 is a transverse section of the front end bar or rail, showing the pin in proper position to locate the blades or slats in fixed adjustment.

The present invention has relation to separator-sieves; and it consists of the different parts and combination of parts hereinafter described, and particularly pointed out in the claims.

Similar numerals of reference indicate corresponding parts in all the figures of the drawings.

In the accompanying drawings, 1 represents the end members of the frame, and 2 the side members, said members 1 and 2 being connected together in such a manner that a rectangular frame is provided. To the side members 2 are journaled the blade or slat rods 3, which blade or slat rods extend transversely across the frame.

For the purpose of strengthening the frame and at the same time preventing the rods 3 from springing the center rail 5 is provided, which center rail is connected to the end members of the frame in any convenient and well-known manner. The blades or slats 6 are connected to the rods 1 at their rear edges, preferably by bending a portion of said blades or slats around the rods 3 and soldering or otherwise securely connecting said bent portions to the rods 3.

To one end of each of the blades or slats 6, upon one side of the center rail 5, are connected the angled flanges 7, said angled flanges being riveted or otherwise connected to the blades or slats 6 and extending downward a sufficient distance to give the desired amount of leverage to swing the blades or slats into proper adjustment.

The front or free edges of the slats 6 are provided with the downturned teeth 8, which downturned teeth are preferably formed integral with the blades or slats 6 and may be formed or extended from under bent portions of said blades or slats, as shown, by which arrangement the teeth are set back from the front or forward edges of the blades or slats.

To the front or forward end member of the frame proper is pivotally connected the bar 9, which bar is provided with the segmental head 10, and for the purpose of operating said lever the segmental head 10 is provided with the downturned lip 11. To the lever 9 is pivotally connected the reciprocating bar 12, to which reciprocating bar is connected or formed integral therewith the flange or ear 13, to which ear is connected the pin 14, said pin being extended through the elongated slot 15, formed in the front or forward angled flange 7.

For the purpose of moving all of the blades or slats in unison by means of the lever 9 the angled flanges 7 are connected together by means of the links 16, said links being pivotally connected to the angled flanges 7, as illustrated in the drawings, and, as illustrated, each link is connected to two of the angled flanges 7.

It will be understood that as the lever 9 is turned upon its pivotal point by means of the downturned lip 11 the bar 12 will be moved longitudinally, thereby swinging all of the blades or slats 6 in unison by means of the connecting-link 16 and the pin 14 engaging the forward angled flange 7 through the elongated slot 14. It will be understood, however, that it is not absolutely essential to connect the forward angled flange 7, as the same object can be accomplished by connecting any one of the angled flanges 7 with the pin 14; but it is necessary to connect all of the angled flanges 7 together by means of the links 16 regardless of the peculiar angled flange 7 connected to the pin 14.

For the purpose of holding the blades or slats at the desired point of adjustment the segmental head 10 is provided with a series of apertures 17, and when the blades or slats have been brought into proper adjustment the pin 18 is passed through the aperture 19, formed in the front end member 1, and through one of the apertures 17.

For the purpose of allowing a reciprocating movement to be imparted to the bar 12 said bar is provided with the elongated slot 20, through which elongated slot is passed the screw 21 or its equivalent and attached to the proper side member 2 of the frame.

For the purpose of giving strength to the angled flanges 7 they are each provided with the lateral flange 22.

It will be understood that by my peculiar arrangement I am enabled to adjust the blades or slats 6 at any desired angle, thereby changing the spaces between said blades or slats, so as to bring the sieve into adjustment for all kinds of grain and seeds and at the same time adjust the sieve for various conditions of the straw.

It is well understood that sieves of this kind require different adjustments to compensate for the various conditions of the straw as to dryness.

Having fully described my invention, what I claim as new, and desire to secure by Letters Patent, is—

1. In an adjustable separator of the kind described, the combination of a frame, a sieve, bars journaled thereto, a series of blades or slats fixed to the rods or bars, downturned flanges connected at one end of the blades or slats located at one side of the center rail, and said downturned flanges pivotally connected by links, and means for adjusting the blades or slats, substantially as and for the purpose specified.

2. In an adjustable sieve for separators, a frame having connected thereto a series of bars, blades or slats fixed thereto at their rear edges and their forward edges provided with downturned teeth, a pivoted lever provided with a segmental head having a downturned lip and a series of apertures, a reciprocating bar journaled to the lever, a pin movable with the reciprocating bar, a downturned flange provided with an elongated slot to engage the pin of the reciprocating bar, angled flanges connected to the blades or slats and the angle-flanges linked together, and with each other and a pin to hold the slats in fixed adjustment, substantially as and for the purpose specified.

In testimony that I claim the above I have hereunto subscribed my name in the presence of two witnesses.

DAVID LIPPY.

Witnesses:
 WILLIS R. LEECH,
 GEO. W. STATLER.